United States Patent
Norris et al.

(10) Patent No.: US 6,353,611 B1
(45) Date of Patent: *Mar. 5, 2002

(54) CALL WAITING FEATURE FOR A TELEPHONE LINE CONNECTED TO THE INTERNET

(75) Inventors: John H. Norris, Highlands; Thomas Leonard Russell, Jr., Colts Neck, both of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/997,018

(22) Filed: Dec. 23, 1997

Related U.S. Application Data

(63) Continuation-in-part of application No. 08/562,678, filed on Nov. 27, 1995, now Pat. No. 5,805,587.

(51) Int. Cl.[7] .......................... H04L 12/66; H04L 12/56; H04M 3/42
(52) U.S. Cl. ....................... 370/356; 370/354; 370/401; 379/201
(58) Field of Search ................................. 370/352–356, 370/400, 401, 237, 496, 230, 389, 466; 379/88.13, 215, 211, 201, 100.01; 395/200.57; 709/204

(56) References Cited

U.S. PATENT DOCUMENTS

| | | | |
|---|---|---|---|
| 4,995,074 A | 2/1991 | Goldman et al. | 379/93.35 |
| 5,274,700 A | 12/1993 | Gechter et al. | 379/210 |
| 5,363,431 A | 11/1994 | Schull et al. | 379/88.12 |
| 5,428,608 A | 6/1995 | Freeman et al. | 370/261 |

(List continued on next page.)

FOREIGN PATENT DOCUMENTS

| | | |
|---|---|---|
| AU | B-59680/98 | 9/1998 |
| CA | 2138565 | 6/1996 |
| DE | 3315884 | 11/1984 |

(List continued on next page.)

OTHER PUBLICATIONS

Schoen U. et al., "Convergence between Public Switching and the Internet", World Telecommunications Congress, International Switching Symposium (ISS), Toronto, CA, Pinnacle Group, 1997, pp. 549–560.

European Patent Office Communication, Application No. 98124232.4, Dated Aug. 20, 2001.

(List continued on next page.)

*Primary Examiner*—Hassan Kizou
*Assistant Examiner*—John Pezzlo

(57) ABSTRACT

Conventional Internet access service and new computer programs are added to a conventional telephone central office. This system is able to alert a subscriber whose telephone line is connected to the Internet of a waiting call via the Internet access connection. Specifically, in response to a call that is waiting for a subscriber, the system establishes a new communication with the subscriber using the Internet access connection and new programs in the subscriber's data terminal. The system then notifies the subscriber of the waiting call via the Internet access connection. The system may then forward the telephone call to the subscriber via the Internet access connection responsive to a subscriber's request to do so without terminating the subscriber's Internet connection, or the subscriber may choose to answer the call in a conventional manner, or may select another option in response to the call notification.

54 Claims, 7 Drawing Sheets

U.S. PATENT DOCUMENTS

| | | | |
|---|---|---|---|
| 5,533,110 A | | 7/1996 | Pinard et al. ................ 379/201 |
| 5,619,561 A | | 4/1997 | Reese .................... 379/142.08 |
| 5,659,542 A | * | 8/1997 | Bell et al. .................... 370/496 |
| 5,712,907 A | | 1/1998 | Wegner et al. .............. 379/112 |
| 5,724,412 A | | 3/1998 | Srinivasan ............... 379/93.23 |
| 5,729,599 A | * | 3/1998 | Plomondon et al. ........ 379/211 |
| 5,742,596 A | * | 4/1998 | Baratz et al. ............... 370/356 |
| 5,751,706 A | | 5/1998 | Land et al. .................. 370/352 |
| 5,768,513 A | | 6/1998 | Kuthyar et al. ............. 709/204 |
| 5,805,587 A | * | 9/1998 | Norris et al. ............... 370/352 |
| 5,809,128 A | * | 9/1998 | McMullin ................... 379/215 |
| 5,818,919 A | * | 10/1998 | Berberich, Jr. et al. ..... 379/211 |
| 5,870,565 A | | 2/1999 | Glitho ........................ 709/249 |
| 5,894,504 A | * | 4/1999 | Alfred et al. ............ 379/88.13 |
| 5,896,444 A | | 4/1999 | Perlman et al. .......... 379/93.35 |
| 5,916,302 A | * | 6/1999 | Dunn et al. ................. 709/204 |
| 5,923,659 A | * | 7/1999 | Curry et al. ................ 370/401 |
| 5,946,381 A | | 8/1999 | Danne et al. ............... 379/142 |
| 6,005,870 A | * | 12/1999 | Leung et al. ............... 370/466 |
| 6,011,909 A | * | 1/2000 | Newlin et al. ......... 395/200.57 |
| 6,028,917 A | * | 2/2000 | Creamer et al. ........ 379/100.01 |
| 6,154,445 A | * | 11/2000 | Farris et al. ................ 370/237 |

FOREIGN PATENT DOCUMENTS

| | | | | |
|---|---|---|---|---|
| EP | | 0 758 175 A1 | 2/1997 | |
| EP | | 0 794 643 A2 | 9/1997 | |
| EP | | 0 800 325 A2 | 10/1997 | |
| EP | | 0 856 981 A2 | 8/1998 | |
| EP | | 0 905 959 A2 | 3/1999 | |
| JP | | 06217032 A | 8/1994 | |
| JP | | 07170288 A | 7/1995 | |
| WO | | WO 95/18501 | 7/1995 | |
| WO | | WO 97/14238 | 4/1997 | |
| WO | | WO 97/16007 | 5/1997 | |
| WO | | WO 97/20424 | 6/1997 | |
| WO | | WO 97/28628 | 8/1997 | |
| WO | | WO 97/37483 | 10/1997 | |
| WO | | WO 97/46073 | 12/1997 | |
| WO | | 97/47118 | * 12/1997 | ............ H04M/3/42 |
| WO | | WO 97/47118 | 12/1997 | |
| WO | | WO 97/47119 | 12/1997 | |
| WO | | WO 97/47127 | 12/1997 | |
| WO | | WO 98/01985 | 1/1998 | |
| WO | | WO 98/07266 | 2/1998 | |
| WO | | WO 98/19240 | 5/1998 | |
| WO | | WO 98/19448 | 5/1998 | |
| WO | | WO 98/19471 | 5/1998 | |
| WO | | WO 98/24224 | 6/1998 | |
| WO | | WO 98/36551 | 8/1998 | |
| WO | | WO 98/41032 | 9/1998 | |
| WO | | WO 98/51063 | 11/1998 | |
| WO | | WO 98/52332 | 11/1998 | |
| WO | | WO 98/52339 | 11/1998 | |
| WO | | WO 98/53617 | 11/1998 | |
| WO | | WO 98/54871 | 12/1998 | |
| WO | | WO 99/14924 | 3/1999 | |

OTHER PUBLICATIONS

European Search Report, Application No. EP 98 12 4232; Date of completion of the search: Jul. 24, 2001.

Lack of Unity of Invention Sheet B, Application No. EP 98 12 4232.

Annex to the European Search Report on European Patent Application No. EP 98 12 4232.

Babbage, R., Moffat, I., O'Neill, A., and Sivaraj, S., "Internet Phone—Changing The Telephony Paradigm?" *BT Technol J*, Apr. 2, 1997, vol. 15, No. 2, pp. 145–157.

Low, Colin, "The Internet Telephony Red Herring," Hewlett–Packard, Jun. 1996, pp. 1–15.

Muller, Nathan, "Dial 1–800–Internet," *BYTE*, Feb. 1996, pp. 83, 84, 86 and 88.

Yang, C., "INETPhone: Telephone Services and Servers on Internet," Apr. 1995, pp. 1–5.

"Workstation Communications System," *IBM Technical Disclosure Bulletin*, Sep. 1994, vol. 37, No. 09, pp. 101–104.

Harris, S., Psimentos, N., Richards, P., and Ebert, I, "Diversification and Integration of Networks and Switching Technologies Towards the $21^{st}$ Century," International Switching Symposium, Oct. 1992, vol. 2, pp. 127–131.

English language translation of WO 98/52339.

English language translation of WO 98/52332.

Abstract corresponding to JP07170288A, MicroPatent Reference No. 000134424.

Abstract corresponding to JP06217032A, MicroPatent Reference No. 000196078.

Dialog Abstract corresponding to DE3315884.

* cited by examiner

CALL WAITING FEATURE FOR A TELEPHONE LINE CONNECTED TO THE INTERNET

This application is a continuation-in-part of U.S. patent application Ser. No. 08/562,678, filed Nov. 27, 1995, now U.S. Pat. No. 5,805,587.

FIELD OF THE INVENTION

The invention relates to a call waiting feature for telephone calls and more particularly relates to a call waiting feature for a called telephone station set that is busy as a result of being connected to the Internet via an enhanced telephone central office system.

BACKGROUND OF THE INVENTION

Call waiting is a telephone feature that is provided by a telephone switching office, e.g., a Central Office (CO), to alert a called party to an incoming call when that party's telephone station set is busy with another call. We have recognized that a telephone switching office cannot apply the call waiting feature to the telephone line that is connected to the well-known Internet. This limitation stems from the fact that the application of call waiting signals to the telephone line would interfere with the data connection. Also, when a data call is established between a subscriber's telephone line and the Internet via an Internet Access Service (IAS), the subscriber would not be able to hear the call waiting tone even if the data connection/communications were able to recover from the interference. Disadvantageously, then, a telephone subscriber who subscribes to call waiting cannot be notified that a call is waiting when the subscriber's line is connected to the Internet.

In co-pending U.S. application Ser. No. 08/562,678, filed Nov. 27, 1995, entitled "Call Notification Feature for a Telephone Line Connected to the Internet," which is incorporated herein by reference, we disclosed a method to overcome this disadvantage: by placing new functionality at the IAS and the called party's data terminal; by activating conventional call forwarding to route the subscriber's incoming calls to the IAS rather than giving busy signals; and by utilizing the new IAS and data terminal functionality first to notify the called party of the incoming call, and then, if requested by the called party, to connect that call to the called party. The connection between the incoming call and the called party was via the IAS and data terminal on the existing connection by converting conventional telephone voice signals to packetized voice signals suitable for transmission over an Internet connection.

SUMMARY OF THE INVENTION

In accordance with the present invention, we have found that an alternative to the call forwarding feature disclosed in U.S. Ser. No. 08/562,678 may be used to achieve the same benefit, i.e., to notify a subscriber of a waiting call even though the subscriber's telephone line is connected to the Internet. This alternative also provides the additional benefit of providing the subscriber with additional options for responding to incoming calls. Specifically, in accordance with the present invention, the telephone central office serving the subscriber may be equipped with the Internet Access Service provisions disclosed in U.S. Ser. No. 08/562,678. A call directed to the subscriber will be processed at such an enhanced central office (ECO) in a conventional manner if the subscriber is not connected to the Internet via its IAS equipment, and will now be processed according to a method similar to that disclosed in U.S. Ser. No. 08/562,678 if the subscriber is connected to the Internet via the ECO's IAS equipment. That is, the ECO's IAS establishes a new communication with the subscriber via the Internet access connection, and then notifies the subscriber of the waiting call via the Internet access connection. The ECO may then connect the incoming telephone call to the subscriber via that Internet access connection responsive to a subscriber request to do so.

Additionally, the subscriber may be offered service options not available with conventional telephone central office services nor disclosed in U.S. Ser. No. 08/562,678, e.g., the option of terminating or suspending the Internet call so as to be able to answer an incoming call in a conventional manner, and the option to set up a three-way conference among the subscriber (talking via the existing Internet connection) and two incoming calls from other parties.

DETAILED DESCRIPTION

An illustrative embodiment of the invention will be discussed in the context of a public switched network including a local exchange carrier (central office). It is understood of course that such a discussion is not to be taken as a limitation, since the claimed invention may be practiced in conjunction with different types of telecommunications systems, for example, a private telecommunications network.

Figure 1:
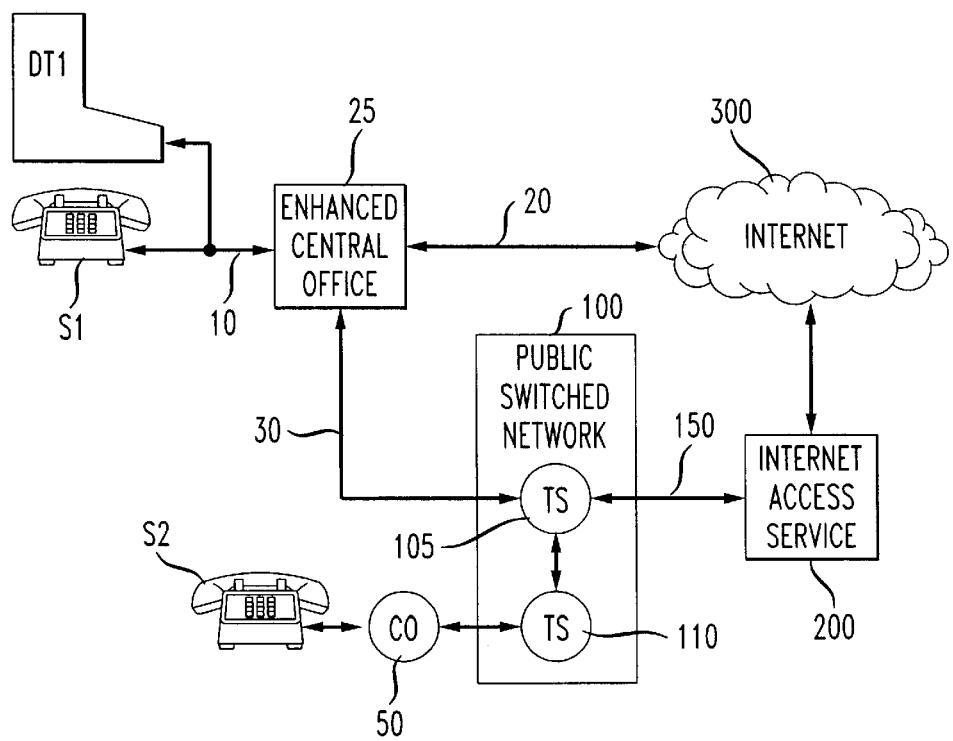
FIG. 1 illustrates a telecommunications system in which the principles of the invention may be practiced.

Accordingly, then, in a conventional manner, a telephone subscriber, e.g., the subscriber associated with telephone station S1, FIG. 1, may access the well-known Internet by first loading appropriate Internet communications software, e.g., the Windows 95 Dialup Networking Software with accompanying TCP/IP stack from Microsoft Corp. of Redmond, Wash. (hereinafter, Windows 95 Dialup Networking Software), into associated data terminal DT1, which may be, for example, a personal computer having multimedia and telephony capability, as will be discussed below. The subscriber may then cause terminal DT1 to place a telephone call to an Internet access service that the subscriber is associated with, such as Internet Access Service (IAS) 200, to access the Internet, represented by block 300. In doing so, terminal DT1 places telephone line 10 in an off-hook state and then dials the telephone number assigned to IAS 200. Assuming that IAS 200 is not located in the same local dialing region as terminal DT1, then the telephone call will be routed via public switched network (PSN) 100, e.g., the AT&T network. Specifically, upon receipt of the dialed number, then enhanced central office ECO 25, in a conventional manner, establishes a telephone connection to toll switch (TS) 105 via path 30. TS 105, in turn and in a conventional manner, establishes a connection to IAS 200 via path 150. IAS 200 then sends conventional data communications signals to the terminal DT1 software (e.g., the aforementioned Windows 95 Dialup Networking Software) that allows the subscriber to communicate/interface with Internet 300.

In the current invention, the subscriber may alternatively access the Internet directly from the subscriber's enhanced central office ECO 25, as will be described in detail below. The subscriber causes the data terminal DT1 to place a telephone call to a telephone number which ECO 25 recognizes as a request to connect to the Internet via ECO 25's own Internet access equipment subunits.

Figure 2:
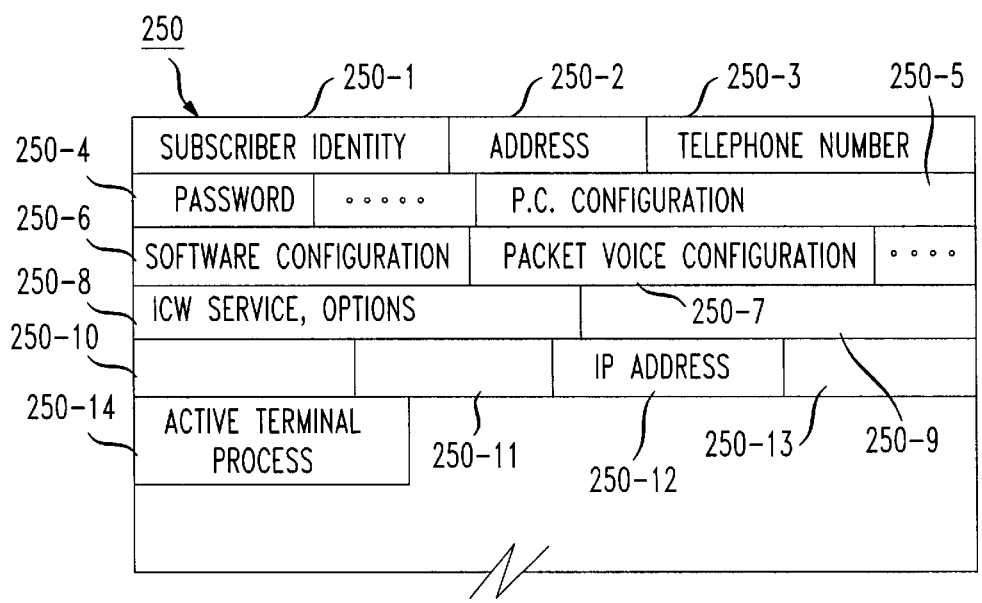
FIG. 2 is an illustrative example of a data record that may be used to implement the inventive service in the system of FIG. 1.

Responsive to receipt of the subscriber's Internet access request, ECO 25 takes a telephone number it associates with the subscriber's line ("ANI")and then translates the ANI into a memory address that it uses to access its internal memory to unload a data record that is associated with the subscriber. An illustrative example of such a record is shown in FIG. 2. Specifically, record 250 is formed from a number of fields respectively containing the subscriber's identity (name) 250-1, address 250-2, telephone number (ANI) 250-3, password 250-4, and other data. ECO 25 permits the caller to access Internet 300 if a password that the caller/subscriber enters via DT1 matches the contents of field 250-4. If such a match does not occur after the caller has made a number of attempts to enter the correct password via terminal DT1, then ECO 25 terminates the call, as is done conventionally whenever a login fails. Assuming a match occurs, then ECO 25 communicates with the caller in accordance with the contents of fields 250-5 and 250-6 (FIG. 2), which respectively specify the configuration of terminal DT1 and configuration of the Internet interface software, e.g., the aforementioned Windows 95 Dialup Networking Software, loaded in terminal DT1. In addition, ECO 25 assigns an Internet IP address to the call and stores the address in field 250-12. (Alternatively, ECO 25 may assign such an address to the subscriber just once, when the subscriber initially enters a subscription for the service as is done conventionally.) ECO 25 thereafter uses the IP address to route the subscriber's data messages (packets) to and from Internet 300 via a conventional data router, as will be discussed below. The subscriber may then begin to access Internet 300 in a conventional manner. That is, terminal DT1 formulates and transmits data packets addressed to Internet destinations indicative of entries/inquires specified by the subscriber as a result of interacting with Internet 300 using the software loaded in terminal DT1. Similarly, ECO 25 routes to terminal DT1 all packets that it receives from the Internet addressed to terminal DT1.

Figure 3:
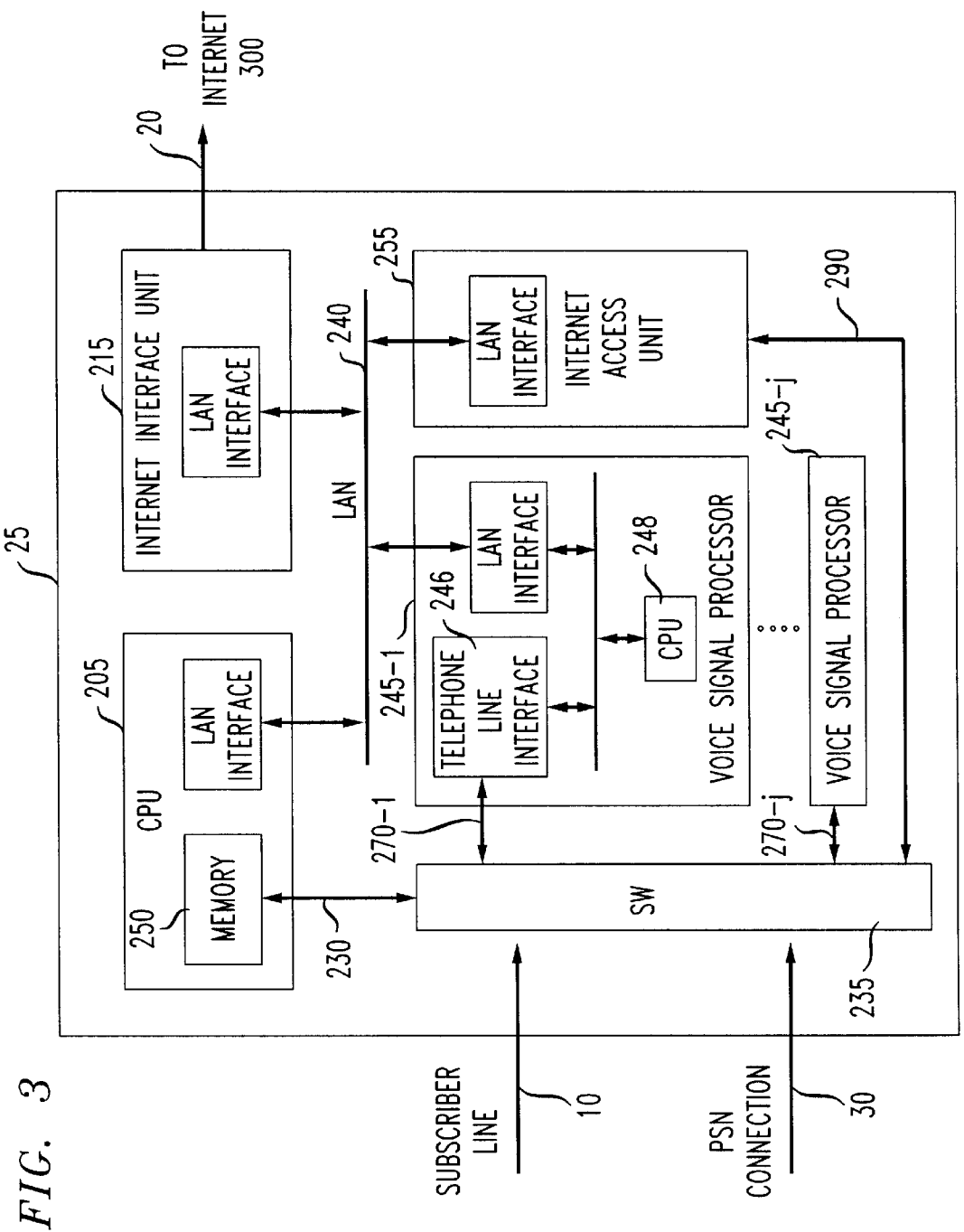
FIG. 3 is a broad block diagram of the Enhanced Central Office (ECO) of FIG. 1.

More specifically and also referring now to FIG. 3, it is seen that an ECO 25 includes Central Processor Unit (CPU) 205, which may be, for example, the central processor of a 5ESS® switch available from Lucent Technologies, Inc. CPU 205 communicates with the various elements forming the associated ECO 25 via control path 230 and local area network (LAN) 240. Such elements include switch SW 235 and Internet Access Unit (IAU) 255, in which SW 235, may be, for example, the switching and peripheral modules of the 5ESS from Lucent and in which IAU 255 may be, for example, the Ascend MAX 4000 apparatus available from Ascend Communications, Inc. of Mountain View, Calif. The ECO 25 also includes an Internet Interface Unit (IIU) 215 for providing a physical as well as a logical interconnection between LAN 240 and Internet 300. IIU 215 includes a conventional data router, for example, the Model 7000 router available from Cisco Systems Inc., and a high-speed data service unit, for example, the DataSMART T3/E3 IDSU available from Kentrox of Portland, Oreg. In any event, it is to be understood that an ECO, as discussed herein, could be a switch added to an ISP, rather than an ISP added to a switch.

When the subscriber's Internet access request call (placed via terminal DT1) is received, ECO 25 causes the call to be connected by SW 235 to IAU 255 via path 290. IAU 255 responds to the call by presenting the caller with a conventional login procedure. If the caller responds by entering the correct password (i.e., the password contained in field 250-4 of the associated record (FIG. 2), which IAU 255 also obtains as a result of communicating with processor 205 via LAN 240), then IAU 255 assigns a conventional IP address to the call as a way of interfacing the call with Internet 300 via IIU 215 and access connection 20. (It is noted that for a conventional Internet access service arrangement, the subscriber may be assigned a permanent IP address which would be stored in field 250-12 (FIG. 2) at the time that the subscriber obtains the service.) In addition, IAU 255 notifies processor 205 that it has completed the connection between terminal DT1 and Internet 300.

Figure 4:
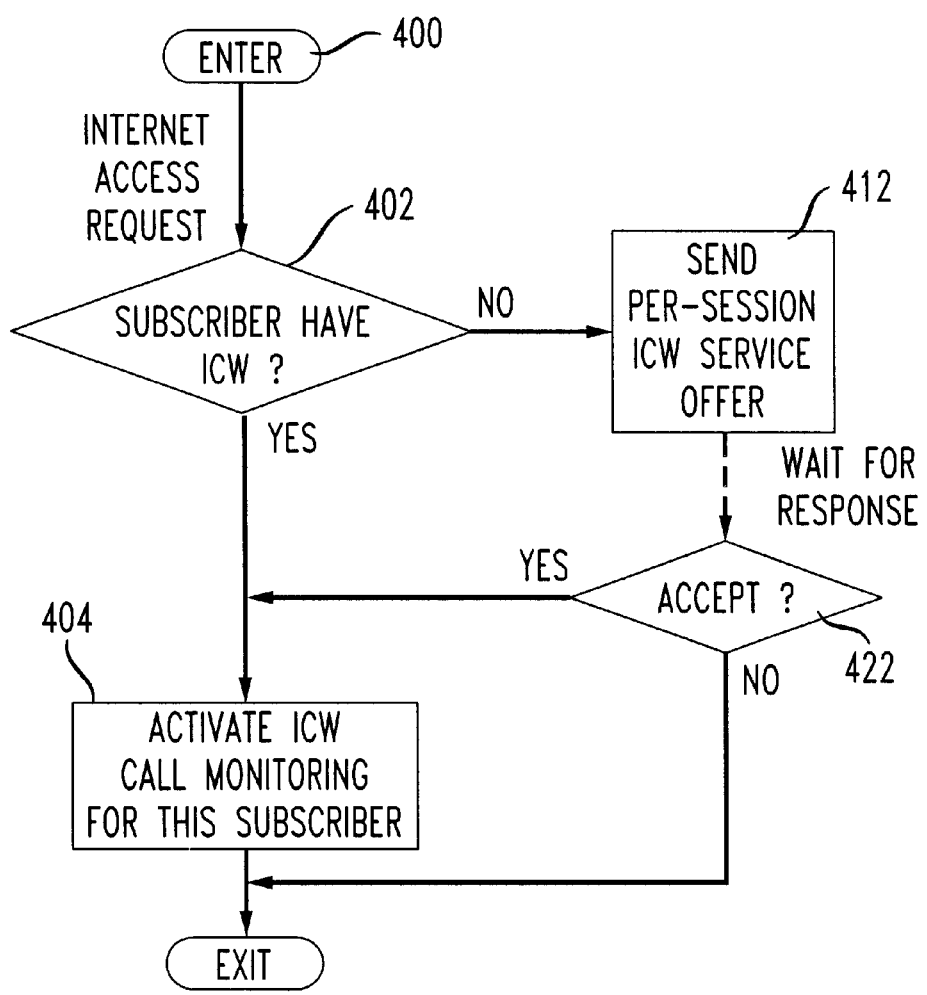
FIGS. 4 and 5 illustrate in flow chart form the programs which implement the principles of the invention in the ECO of FIG. 1.

If the login is successful, then processor 205 invokes the program of FIG. 4. Processor 205, in accord with the program, checks the contents of field 250-8 of the associated record 250 (FIG. 2) to determine if the Internet user subscribes to the inventive "Internet Call Waiting" (ICW) service (block 402). If so, processor 205 then sets up to monitor for calls that might otherwise be given a busy signal as a result of the terminal DT1 subscriber's telephone line 10 being busy on the Internet (block 404). The processor 205 program then exits. If processor 205 finds at block 402 that the Internet user does not subscribe to ICW, then CPU 205 may offer ICW service to the user on a one-time basis for this Internet session. CPU 205 sends a message for display on terminal DT1 which indicates the ICW offer to the user (block 412). If the user accepts (block 422), processor 205 then sets up to monitor for calls to the user which might otherwise be given a busy signal (block 404), so as to be "activated" for this instant Internet session, and sets an indicator in field 250-8 (FIG. 2) indicating ICW is active for this user.

Returning now to FIG. 3, it is seen that ECO 25 includes a plurality of voice signal processors (VSP) 245-1 through 245-j, one of which is illustrated in broad block diagram form, namely, VSP 245-1 (hereinafter just (VSP) 245). VSP 245 includes central processor unit (CPU) 248, telephone line interface (TLI) 246 and a connection to LAN 240. VSP 245 communicates with switch 235 via a selected one of the paths 270, and communicates with processor 205, IIU 215 and IAU 255 via LAN 240.

In an illustrative embodiment of the invention, VSP 245, may be, for example, a personal computer having an Intel Pentium processor running under the Microsoft Windows NT 4.0 operating system, an Etherlink 10BASE-T LAN interface card available from 3Com Corporation of Santa Clara, Calif., and a V.34 Office F/X (version 2.0) sound card having a telephone interface available from Spectrum Signal Processing, Inc. of Mountain View, Calif. VSP 245 interconnects conventional telephone voice signals received from subscriber line 10 via SW 235 and path 270i with conventional TCP/IP packet network communications that is transported over Ethernet LAN 240 and Internet 300. The processing of calls from DT1 and routed to Internet 300 via LAN 240 will be explained below in detail. It is noted at this point, however, that particular software, such as the VocalTec version 4.0 software product available from VocalTec, Inc. of Northvale, N.J., may be used in VSP 245 to process, compress and then packetize voice signals that are received via switch 235 and TLI 246 for transmission to Internet 300 via LAN 240. Similarly, such software may be used to convert the contents of packets representing voice into a stream of voice signals that is transmitted to station S1 via TLI 246, path 270i, SW 235 and subscriber line 10.

If, while the subscriber is busy "surfing" the Internet, a caller at station S2 (FIG. 1) places a call to station S1, then a telephone connection is established in a conventional manner from the station S2 telephone line to ECO 25 via CO 50, TS 110 and TS 105. The signaling information that is transported over path 30 includes, inter alia, the S1 telephone number dialed by S2. Such information may also include the calling party telephone number (station S2) as in conventional Caller ID. SW 235 (FIG. 3), responsive to receipt of such information, sends a message identifying the newly-arrived call and containing information relating thereto to processor 205 via control connection 230. Processor 205, in turn, instructs SW 235 to assign an idle VSP 245i to the call.

Since the station S2 call is routed to ECO 25 via path 30, then the call is received via SW 235 as is done conventionally. Also referring now to FIG. 5, upon receipt of the call, SW 235 alerts processor 205 to the incoming call and passes the station S2 telephone number (if available) as well as the station Si telephone number (the dialed number DN) thereto. Processor 205 in response to receipt of S1's number (DN) uses the number to access its internal memory and unload a copy of the subscriber's record 250 (block 511). If the subscriber is not connected to the Internet or if the subscriber does not subscribe to Internet Call Waiting (ICW), then processor 205 exits, thereby continuing to process the call in a conventional manner, e.g., give a busy signal or provide "call forward on busy" as per S1's conventional service subscriptions. If, on the other hand, the contents of fields 250-14 and 250-8, FIG. 2, indicate that the called subscriber is busy on the Internet, and has ICW service, then processor 205 checks whether the user already has an ICW call active between the user's DT1 terminal and a calling party S2 (block 512). If so, then (as in conventional call waiting when a subscriber already has two active calls), CPU 205 exits to continue conventional busy-line call processing. If not (or if so, and the user also subscribes to an ICW service option as explained below), then CPU 205 instructs SW 235 to connect path 30 to "audible ring" (i.e., providing audible ringing to the caller's telephone) and (block 513) forms an alerting message indicating, inter alia, (a) that a call is waiting, (b) telephone number of the waiting call (the "caller ID", if available), and (c) call answering options: connect call via the Internet connection to terminal DT1 as mentioned above; forward call to another telephone number (which may be the user's voice mail service "voice mailbox" or other destination); suspend or interrupt the user's Internet connection to enable the user to receive the incoming call at conventional voice terminal Si; ignore call; or other ICW option such as to set up a three-way conference call. The selection of options available to each ICW subscriber is set at the time of subscription and is indicated by the contents of field 250-8 (FIG. 2). Processor 205 then assembles the message into one or more data packets each containing DT1's assigned Internet IP address as the destination and supplies each such packet to IIU 215 via LAN 240 (block 514). IIU 215, in turn, routes the packets to module IAU 255, which then transmits the payload data as it is received over path 290 in a conventional manner. The data is then transported over the path 290 connection to SW 235 for transmission over telephone line 10. Upon receipt of the data, terminal DT1 displays the information characterized by the data on the terminal DT1 display, thereby alerting the subscriber to the waiting call even though the subscriber's telephone line is connected to the Internet, in accordance with an aspect of the invention.

Figure 5:
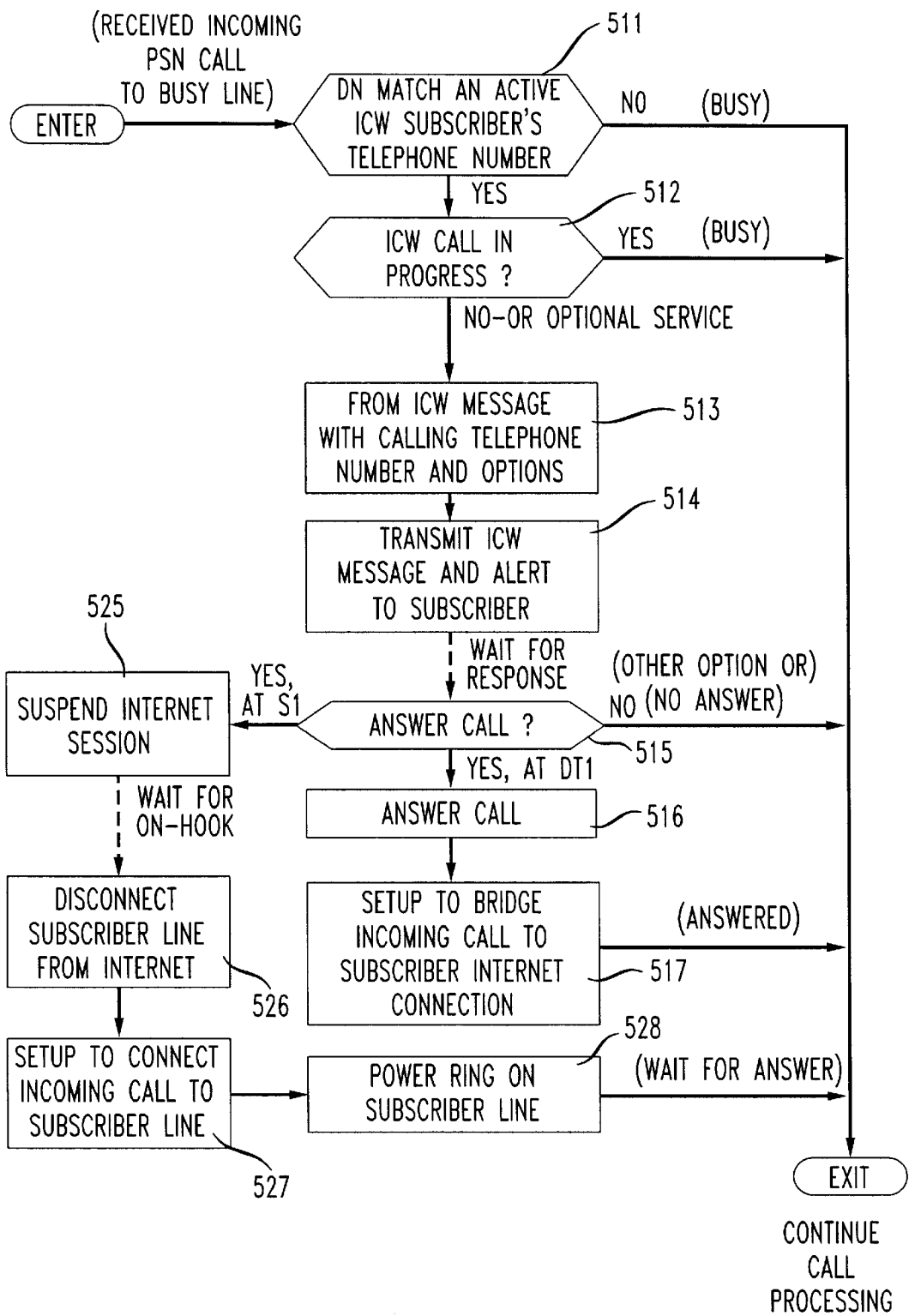

Following the foregoing, processor 205 waits for receipt of a response from the alerted subscriber, as represented by the dashed line between blocks 514 and 515 in FIG. 5. When processor 205 receives the expected response, processor 205 checks to see if the subscriber elected to answer the station S2 call (block 515). If so, and the call is to be answered at DT1, processor 205 directs VSP 245 (i.e., TLI 246 and CPU 248) to answer the call (block 516). TLI 246 transmits an answer supervision signal over path 270-i. In response to receipt of the latter signal, SW 235 sends an answer supervision signal for the incoming call to TS 105 (FIG. 1) via path 30. Processor 205 then sets up to bridge the calling party to the subscriber via VSP 245, LAN 240 and IAU 255 (block 517). Such "bridging" is established between VSP 245 and IAU 255 via LAN 240 and IIU 215 as in conventional packet data communications. Processor 205 unloads from memory 250 (i.e., field 250-7, FIG. 2) information identifying the type of packet voice software that is loaded in the subscriber's terminal DT1. Processor 205 then instructs processor 248 (VSP 245) to invoke the aforementioned VocalTec software (or other software that performs a similar function) that is designed to process a telephone call that is to be transported over the Internet 300. The CPU 248 software, in turn, returns a response to processor 205 acknowledging its instruction to receive and transmit packets from and to the IP address previously assigned to the subscriber's Internet connection via access unit 255.

Thereafter, the assigned VSP 245/TLI 246 supplies voice signals that it receives from the calling party to CPU 248 as a conventional data stream. CPU 248, in turn, collects the signals and forms them into packets in accordance with the aforementioned VocalTec software, which attaches to each such packet the IP address assigned to the subscriber's connection. CPU 248 then presents the packet to LAN 240 and IIU 215, which in turn routes the packet in a conventional manner to the LAN 240 port connected to access unit 255. Unit 255, in turn, transmits the data packet as well as any other packets received from Internet 300 and addressed to DT1 over the subscriber's connection. Briefly referring again to FIG. 1, in an illustrative embodiment of the invention, data terminal DT1 may be, for example, a personal computer running under the Microsoft Windows 95 operating system and driven by, for example, the Intel Pentium processor. Terminal DT1 also includes a conventional sound card, such as the UltraSound MAX sound card available from Gravis Computer Technology of Bellingham, Wash., as well as attached speakers and microphone. Also, conventional software packages such as the aforementioned Windows 95 Dialup Networking software and Internet Phone software, version 4.0, also available from VocalTec are loaded in terminal DT1. As configured, a conventional modem interfaces terminal DT1 with telephone line 10.

When terminal DT1 receives packets via line 10, the Internet software running on the subscriber's terminal DT1 examines each such packet to determine if it contains voice signals or information originating from the Internet. If the former, then the "Internet Phone" software reassembles the voice signal from a series of received packets, as is done conventionally, and then presents the result to the terminal DT1 sound card which causes the signals to be routed to the terminal DT1 loudspeaker for presentation to the subscriber. Internet information, on the other hand, is identified and processed in a background mode for display on the terminal DT1 display.

When the subscriber talks into the terminal DT1 microphone, the resulting voice signals are converted into a series of packets by the sound card and accompanying software. Terminal DT1 then outputs the packets via the terminal DT1 modem to line 10 for transmission to VSP 245. In doing so, terminal DT1 software inserts an address in each such packet so that the packet may be routed to the originator of the call, as is done conventionally in the transmission of a voice packet in telephony. Each packet that VSP 245 receives from terminal DT1 is transported via path 290, IAU 255 and LAN 240 to IIU 215 which then routes the packet to either Internet 300 or VSP 245 based on the destination address contained in the packet. The VSP 245 port that receives the packet unloads the payload and passes it to the packet voice software that CPU 248 is executing. That is, CPU 248 converts a series of voice packets into a digital voice signal, which TLI 246 then supplies to SW 235 via path 270. SW 235, in turn, transmits the voice signal over path 30 to TS 105, which retransmits the signal to station S2 by way of CO 50. The call waiting party and Internet connected subscriber may continue to communicate with one another in this manner, until the call is terminated.

In response to receipt of the call-waiting notification, the subscriber may elect to answer the station S2 call using conventional telephone receiver S1. If so, then processor 205 (block 525, FIG. 5) interrupts the user's Internet session, changes the indicators of field 250-14 (FIG. 2) to "inactive," then waits for subscriber line 10 to become idle (on-hook condition). Upon receiving the on-hook status from SW 235 (block 526), processor 205 instructs SW 235 to disconnect line 10 from path 290 (FIG. 3). Processor 205 then sets up to complete the incoming call in a conventional manner (block 527), applies power ring to line 10 (block 528) so as to cause receiver S1 to ring, then exits (conventional wait-for-answer call processing).

Figure 6:
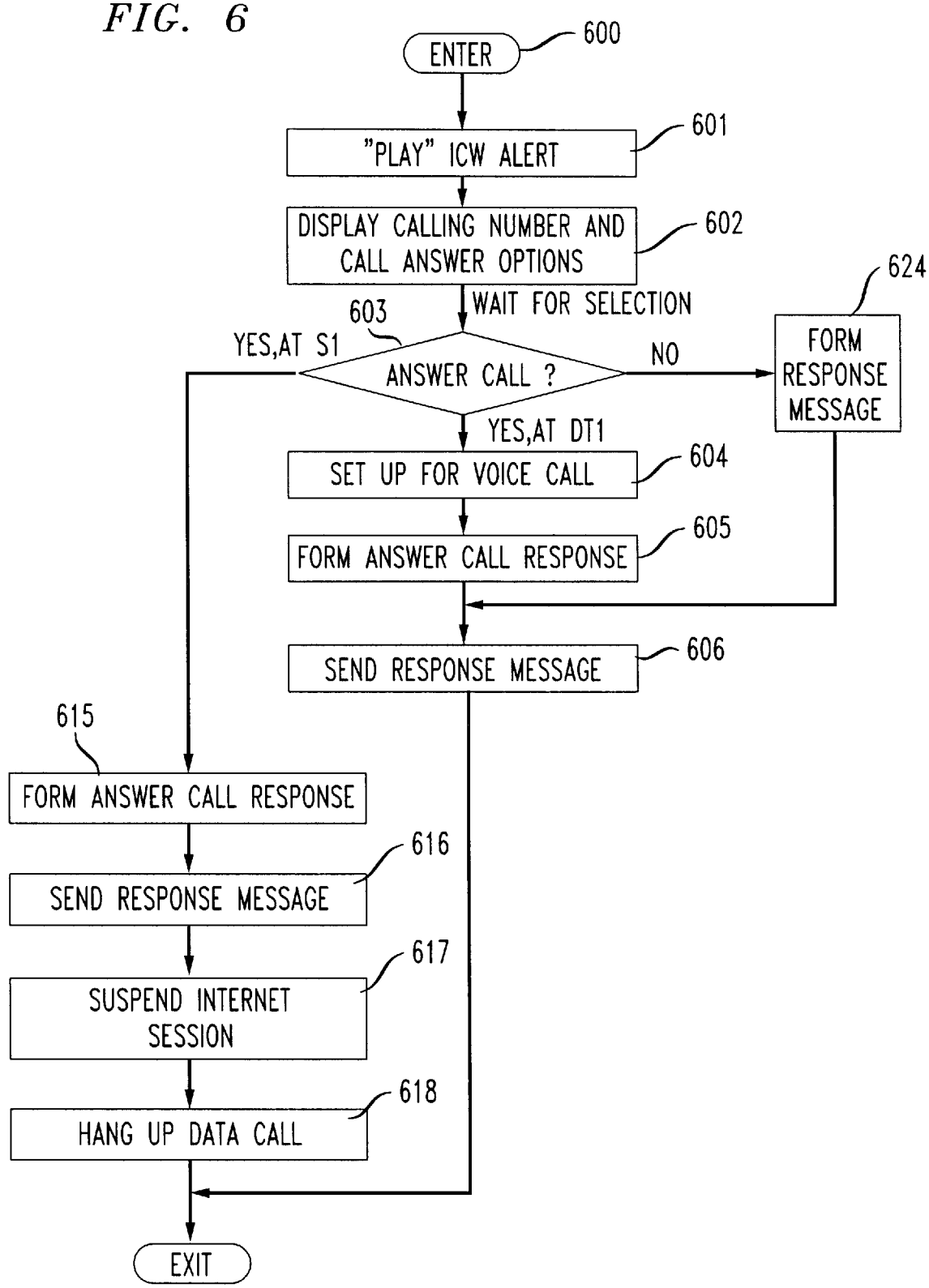
FIGS. 6 and 7 illustrate in flow chart form the programs which implement the principles of the invention in the subscriber terminal of FIG. 1.

When terminal DT1 receives a data message encoded in analog form via its modem and telephone line 10, the modem converts the encoded analog signal to a digital signal, which is then accumulated to form a message. If the message represents the aforementioned call waiting message, then terminal DT1 invokes the program of FIG. 6 to process the message. Specifically, the DT1 program causes the terminal DT1 hardware to generate and output via the terminal loudspeaker(s) a tone that simulates an alerting signal, e.g., a ringing signal (block 601). The program then displays the option message along with the calling telephone number ("Caller ID"), if available (block 602). If the subscriber selects one of the displayed options, then the program checks to see if the entered option is to answer the call (block 603). If so, and the call is to be answered at DT1, then the program prepares to execute the aforementioned VocalTec Internet Phone software (block 604) that allows the subscriber to place and/or receive a voice call via the Internet by storing in associated memory the IP address of VSP 245 contained in the message sent by ECO 25 (processor 205). The terminal DT1 program then forms a response to answer the call at DT1 (block 605) and transmits the response to ECO 25 (block 606). If the subscriber elects to answer the call at S1, the DT1 program forms a response to answer the call at S1 (block 615), transmits the response to ECO 25 (block 616), suspends the subscriber's Internet activity (block 617), and puts the subscriber line 10 back in an idle (on hook) condition to allow the incoming call to be received in a conventional manner by the subscriber (block 618). (If the subscriber's terminal DT1 has the capability to answer incoming calls in a conventional manner, it will deactivate this capability prior to exiting the program). Referring again to block 603, FIG. 6, if the subscriber has elected a choice other than answering the call at DT1 or S1, then the DT1 program forms the corresponding response (block 624), proceeds to block 606 and then exits.

Figure 7:
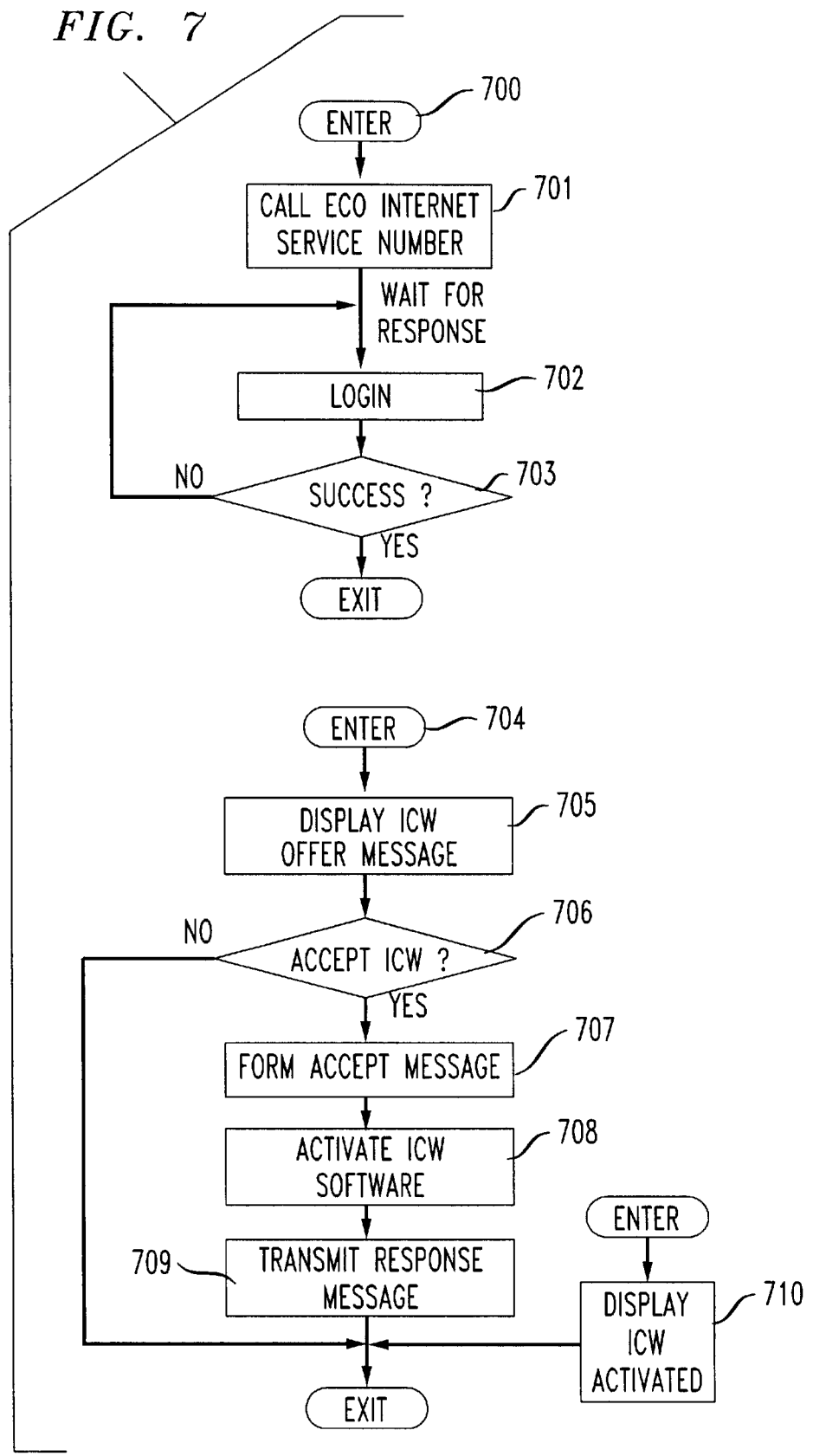

FIG. 7 illustrates, in flow chart form, the program that a terminal, e.g., terminal DT1, may invoke to place a telephone call to an Internet access service, e.g., ECO 25, for the purpose of establishing a connection to the Internet. As mentioned above, such software may be any one of a number of different commercial software products that are designed to allow a user to interact with the Internet, for example, the aforementioned Windows 95 Dialup Networking software. Specifically, when the terminal program is invoked it unloads from internal memory a data record containing the telephone number that the call uses to access the Internet (block 701). The program then places a call to that telephone number and then waits for receipt of a response from the called Internet access service, e.g., ECO 25. Upon receipt of the expected response, the program sets up a "login" into the called IAS (block 702) as is done conventionally by transmitting a requested password. If the login is successful (block 703), the terminal application program that is loaded when the subscriber establishes the Internet session, sends a message to processor 205 indicating that it can receive a call alert message. If processor 205 receives that message, then it updates the contents of field 250-14 (FIG. 2) to indicate that the user may receive call alert messages. The program then exits. If the login is not successful, then the caller/subscriber may re-enter his/her password (block 702). It is noted that ECO 25 may terminate the call if the caller fails to enter a valid password after making several attempts to do so.

If the DT1 program receives a message offering per-session ICW service, then the program is re-entered (block 704) and displays the message (block 705). If the caller/subscriber responds via, e.g., the terminal DT1 keyboard, the program checks the entry to see if the subscriber accepts (block 706). If not, then the program exits. Otherwise, the program forms a message accepting the offer (block 707), activates ICW-associated software (block 708), transmits the message (block 709) and then exits. Thereafter, when the program receives a message from ECO 25 indicating that ICW has been activated, then the program (block 710) displays that event and then exits.

Figure 8:
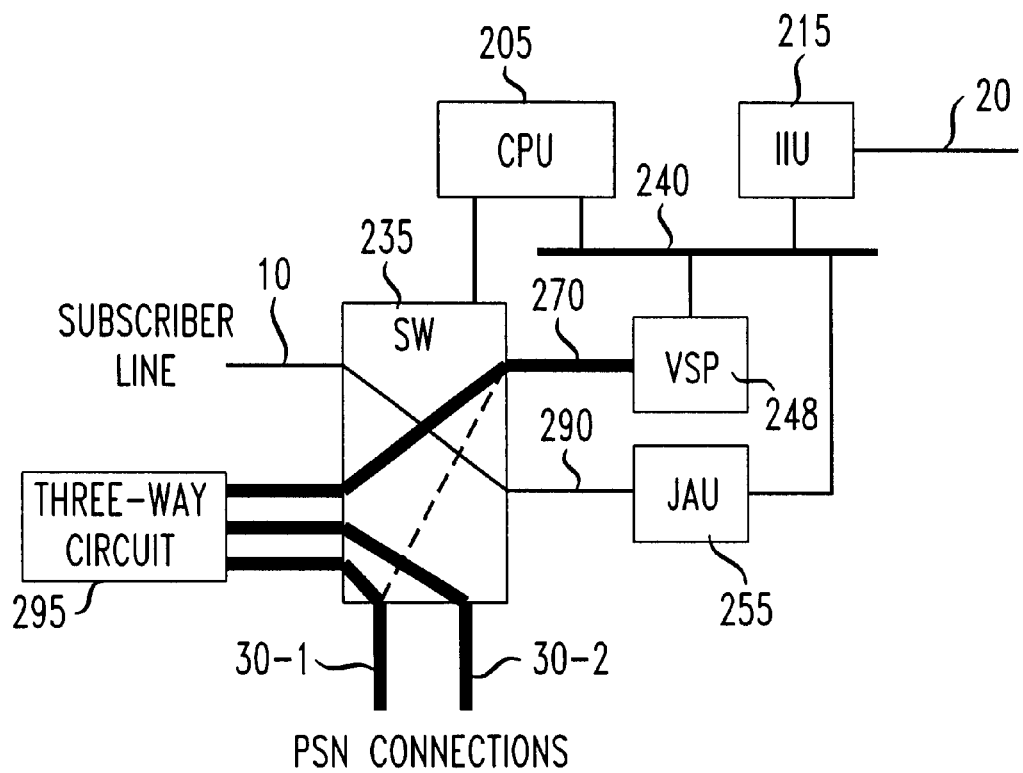
FIG. 8 is a second block diagram of the ECO of FIG. 1 illustrating an additional aspect of the invention.

Referring now to FIG. 8, ECO 25 of FIG. 1 and FIG. 3 is now illustrated in broad block diagram form including a conventional telephone central office three-way circuit 295 attached in a conventional manner to switch 235, and also now with two PSN call connections shown as 30-1 and 30-2. The three heavy lines in FIG. 8 (295 to 270; 295 to 30-1; 295 to 30-2) illustrate the three legs of a three-way call set up by processor 205 in response to a request from an Internet user at terminal DT1 and line 10 to have a three-way conference with caller S2 (FIG. 1) and another party (such request formed at block 624, FIG. 6 and received by CPU 205 at block 515, FIG. 5). The dashed line (270 to 30-1 within SW 235, FIG. 8) illustrates the DT1-to-S2 call connection which was removed by SW 235 when processor 205 instructed it to set up the three-way connection.

The foregoing is merely illustrative of the principles of the invention. Those skilled in the art will be able to devise numerous arrangements, which, although not explicitly shown or described herein, nevertheless embody those principles that are within the spirit and scope of the invention. For example, the Internet is used in the present application as an illustrative example of a data network used in practicing the invention. The Internet is a specific type of data network in that it utilizes a set of unique network standards to support communications across computers. This set of network standards is typically referred to as TCP/IP ("Transmission Control Protocol/Internet Protocol"). The "Internet" (when capitalized) typically refers to the collective set of computers and networks that make up the global public data network that is based on the TCP/IP standards. However, in addition to the Internet, other networks based on the TCP/IP standards such as an "internet" (uncapitalized refers to a public data network in a generic sense) or an "intranet" (refers to a private data network in a generic sense) could be used to practice the invention. Moreover, additional data networks not based on the TCP/IP standards can be used in practicing the invention because the invention does not rely on a specific data network protocol implementation such as TCP/IP. All that would be required is that the data network include the ability to multiplex streams of data packets across a network interface, and uniquely address computers and sessions running on the network. As such, the data network used to practice the present invention could be a private corporate intranet, rather than the Internet, that utilizes an enhanced private branch exchange (PBX), rather than a local central office switch, as the ECO.

We claim:

1. A method of processing a telephone call from a calling station to a called station that is busy as a result of having established a connection to a data network via a central office, said central office including a switch and data network access equipment for connecting said called station to said data network and for alerting a subscriber at said called station to receipt of said call from said calling station via said connection to said data network, said method comprising the steps of:

receiving said call at said central office and responsive to said called station being busy, said central office sending a message to said called station via said connection to said data network to alert said subscriber at said called station to the receipt of said call, and said central office connecting said calling station to said called station via said connection to said data network so that a caller at said calling station may communicate with said subscriber at said called station.

2. The method of claim 1 wherein said central office includes an access server for establishing connections to said data network.

3. The method of claim 1 wherein said step of connecting said calling station includes the step of, responsive to receiving from said called station via said connection a message containing a request to answer said call, then performing said step of connecting.

4. The method of claim 1 wherein said step of connecting said calling station includes the step of multiplexing signals received from said calling station and signals received from said data network and addressed to said called station over said connection to said called station.

5. The met of claim 1 wherein said step of connecting said calling station includes the step of routing data signals received from said called station via said connection to said data network and routing voice signals received from said called station via said connection to said calling station.

6. The method of claim 3 wherein said step of connecting said calling station includes the step of, responsive To said message from said called station containing a request to connect said call from said calling station to an alternate telephone number, then routing said call to said alternate telephone number.

7. The method of claim 3 wherein said step of connecting said calling station includes the step of, responsive to said message from said called station containing a request to set up a three-way call connection between the called station, the calling station and a station currently connected to the called station, then setting up said three-way call connection.

8. The method of claim 1 wherein said step of connecting said calling station includes the step of, responsive to a message from said called station containing a request to not answer said call from a calling station, then not answering said call.

9. The method of claim 1 wherein said data network is an Internet network further comprising the steps of responsive to receiving an initial call from said called station at said central office, connecting said initial call to said Internet, determining if said subscriber also subscribes to a call waiting service, if so, then activating said call waiting service.

10. The method of claim 9 wherein said step of activating includes the step of sending a message to said called station via said connection to notify said called station that said activation has been executed.

11. The method of claim 9 wherein if said subscriber does not subscribe to said call waiting service, then offering said call waiting service for the duration of said Internet connection, and performing said activating step if said subscriber elects to accept said service offer.

12. The method of claim 11 wherein said step of activating includes the step of sending a message to said called station via said connection to notify said called station that said activation has been executed.

13. The method of claim 1 wherein said data network is a public network such as the Internet.

14. The method of claim 1 wherein said data network is a private network such as an intranet.

15. A method of processing a telephone call from a calling station to a called station that is busy as a result of having established a connection to a data network via an enhanced telephone switching system of the public switched network, said method comprising the steps of:

receiving said call at said enhanced telephone switching system and, responsive to said called station being busy, said enhanced telephone switching system sending a message to said called station via said connection to said data network to alert a subscriber at said called station to the receipt of said call, said data message being sent without first having to forward or redirect said call via said public switched network, and said enhanced telephone switching system connecting said calling station to said called station via said connection to said data network so that a caller at said calling station may communicate with a subscriber at said called station.

16. The method of claim 15 wherein said enhanced telephone switching system includes an access server for establishing connections to said data network.

17. The method of claim 15 wherein said step of connecting said calling station includes the step of, responsive to receiving from said called station via said connection a message containing a request to answer said call, then performing said step of connecting.

18. The method of claim 15 wherein said step of connecting said calling station includes to step of multiplexing signals received from said calling station and signals received from said data network and addressed to said called station over said connection to said called station.

19. The method of claim 15 wherein said step of connecting said calling station includes the step of routing data signals received from said called station via said connection to said data network and routing voice signals received from said called station via said connection to said calling station.

20. The method of claim 17 wherein said step of connecting said calling station includes the step of, responsive to said message from said called station containing a request to connect said call from said calling station to an alter telephone number, then routing said call to said alternate telephone number.

21. The method of claim 17 wherein said step of connecting said calling station includes the step of, responsive to said message from said called station containing a request to set up a three-way call connection between the called station, the calling station and a station currently connected to the called station, then setting up said three-way call connection.

22. The method of claim 15 wherein said step of connecting said calling station includes the step of, responsive to a message from said called station containing a request to not answer said call from a calling station, then not answering said call.

23. The method of claim 15 wherein said data network is an Internet network further comprising the steps of
responsive to receiving an initial call from said called station at said enhanced telephone switching system, connecting said initial call to said Internet,
determining if sad subscriber also subscribes to a call waiting service, if so, then activating said call waiting service.

24. The method of claim 23 wherein said step of activating includes the step of sending a message to said called station via said connection to notify said called station that said activation has been executed.

25. The method of claim 23 wherein if said subscriber does not subscribe to said call waiting service, then offering said call waiting service for the duration of said Internet connection, and
performing said activating step if said subscriber elects to accept said service offer.

26. The method of claim 25 wherein said step of activating includes the step of sending a message to said called station via said connection to notify said called station that said activation has been executed.

27. The method of claim 15 wherein said data network is a public network such as the Internet.

28. The method of claim 15 wherein said data network is a private network such as an Internet.

29. A method of processing a call waiting feature for a first telephone station set whose telephone line is connected lo the Internet comprising the steps of
responsive to receiving at a central office, an initial call from said first telephone station, extending a connection from said first telephone station to said Internet,
receiving at said central office a voice call from a second telephone station directed to said first telephone station, and, responsive to said first telephone station being connected to said Internet, said central office sending a data message via said connection to said first telephone station to alert a subscriber to receipt of the voice call from said second telephone station, and
said central office bridging a connection to said second telephone station with the connection between said Internet and said first telephone station so that a caller at said second telephone station may communicate with said subscriber at said first telephone station,
wherein said central office includes a switch and Internet access equipment for extending said connection from said first telephone station to said Internet and for alerting said subscriber at said first telephone station to receipt of said voice call from said second telephone station via said connection to said Internet.

30. The mead of claim 29 wherein said central office includes an access server for extending connections to said Internet.

31. The method of claim 29 further comprising the steps of
responsive to receiving from said first telephone station a message containing a request to answer said voice call, performing said step of bridging.

32. The method of claim 29 wherein said step of bridging said second telephone station includes the step of multiplexing voice signals received from said second telephone station and data signals received from said Internet and addressed to said first telephone station over said connection to said first telephone station.

33. The method of claim 29 wherein said step of bridging said second telephone station includes the step of routing data signals received from said first telephone station via said connection to said Internet and routing voice signals received from said called station via said connection of said calling station.

34. The method of claim 31 wherein said step of bridging said second telephone station includes the step of, responsive to receipt of said message from said first telephone station containing a request to forward said voice call from said second telephone station to an alternate telephone number, then routing said call from said second telephone station to said alternate telephone number.

35. The method of claim 31 wherein said step of bridging said second telephone station includes the step of, responsive to receipt of said message from said first telephone station contain a request to set up a three-way call connection between said first telephone station, said second telephone station and a third telephone station currently connected to said first telephone station, then creating said three-way call connection.

36. The method of claim 29 wherein said step of connecting said calling station includes the step of, responsive to a message from said first telephone station containing a request to not answer said voice call from said first telephone station, then not answering the voice call.

37. The method of claim 29 further comprising the steps of
responsive to connecting the initial call to said Internet determining if a subscriber associated with said first telephone station also subscribes to a call waiting service, if so, then activating said call waiting service.

38. The method of claim 37 wherein if a subscriber associates with said first telephone station does not subscribe to said call waiting service, then offering to activate said call waiting service for the duration of said Internet connection, and
performing said activating step if said subscriber elects to accept said service offer.

39. The method of claim 38 wherein said step of activating includes the step of sending a message to said first telephone station via said Internet connection to notify said subscriber that said activation has been executed.

40. A method of processing a call waiting feature for a first telephone station set whose telephone line is connected to the Internet comprising the steps of responsive to receiving at an enhanced telephone switching system of the public switched network, an initial call from said first telephone station, extending a connection from said first telephone station to said Internet receiving at said enhanced telephone switching system a voice call from a second telephone station directed to said first telephone station, and, responsive to said first telephone station being connected to said Internet, said enhanced telephone switching system sending a data message via said connection to said first telephone station to alert a subscriber to receipt of the voice call from said second telephone station, said data message being sent without first having to forward or redirect said voice call via said public switch network, and said enhanced telephone switching system bridging a connection to said second telephone station with the connection between said Internet and said first telephone station so that a caller at said second telephone station may communicate with said subscriber at said first telephone station.

41. The method of claim 40 wherein said enhanced telephone switching system includes an access server for extending connections to said internet.

42. The method of claim 40 further comprising the steps of responsive to receiving from said first telephone station a message containing a request to answer said voice call, performing said step of bridging.

43. The method of claim 40 wherein said step of bridging said so telephone station includes the step of multiplexing voice signals received from said second telephone station and data signals received from said Internet and addressed to said first telephone station over said connection to said first telephone station.

44. The method of claim 40 wherein said step of bridging said second telephone station includes the step of routing data signals received from said first telephone station via said connection to said Internet and routing voice signals received from said called station via said connection of said calling station.

45. The method of claim 42 wherein said step of bridging said second telephone station includes the step of, responsive to receipt of said message from said first telephone station containing a request to forward said voice call from said second telephone station to an alternate telephone number, then routing said call from said second telephone station to said alternate telephone number.

46. The method of claim 42 wherein said step of bridging said second telephone station includes the step of, responsive to receipt of said message from said first telephone station containing a request to set up a three-way call connection between said first telephone station, said second telephone station and a third telephone station currently connected to said first telephone station, then creating said three-way call connection.

47. The method of claim 40 wherein said step of connecting said calling station includes the step of, responsive to a message from said first telephone station containing a request to not answer said voice call from said first telephone station, then not answering the voice call.

48. The method of claim 40 further comprising the steps of responsive to connecting initial call to said Internet, determining if a subscriber associated with said first telephone station also subscribes to a call waiting service, if so, then activating said call waiting service.

49. The method of claim 48 wherein if a subscriber associated with said first telephone station does not subscribe to said call waiting service, then offering to activate said call waiting service for the duration of said Internet connection, and performing said activating step if said subscriber elects to accept said service offer.

50. The method of claim 49 wherein said step of activating includes the step of sending a message to said first telephone station via said Internet connection to notify said subscriber that said activation has been executed.

51. A method of processing a three-way calling feature for a first telephone station set whose telephone line is connected to the Internet, comprising the steps of responsive to receiving at a central office an initial call from said first telephone station, extending a connection from said first telephone station to said Internet, receiving at said central office a voice call from a second telephone station directed to said first telephone station and, responsive to said first telephone station being connected to said Internet, sad central office sending a data message via said connection to said first telephone station to alert a subscriber to the receipt of the voice call from said second telephone station, and said central office bridging a connection to said second telephone station to the connection between said Internet and said first telephone station so tat a caller at said second telephone station may communicate with said subscribe at said first telephone station, then responsive to receiving at said central office a voice call from a third telephone station directed to said first telephone station while said first telephone station is connected to said second telephone station, said central office bridging connections to said second telephone station and said third telephone station to a three-way conference circuit, and said central office bridging said three-way conference circuit to the connection between said Internet and said first telephone station, wherein said central office includes a switch and Internet access equipment for extending said connection from said first telephone station to said Internet and for alerting said subscriber at said first telephone station to receipt of said voice call from sad second telephone station via said connection to said Internet.

52. The method of claim 51 wherein said step of bridging connections comprises the steps of, responsive to receiving said voice call from said third telephone station at said central office, sending a data message via said Internet con on to said first telephone station to alert a subscriber there at to the receipt of the voice call from said third telephone station, and responsive to receiving from said first telephone station via said Internet connection a message containing a request to three-way answer said voice call, performing said step of bridging connections.

53. A method of processing a three-way calling feature for a first telephone station set whose telephone line is connected to the Internet, comprising the steps of responsive to receiving at an enhanced telephone switching system of the public switched network an initial call from said first telephone station, extending a connection from said first telephone station to said Internet, receiving at said enhanced telephone switching system a voice call from a second telephone station directed to said first telephone station and, responsive to said first telephone station being connected to said Interest, said enhanced telephone switching system sending a data message via said connection to said first telephone station to alert a subscriber to the receipt of the voice call from said second telephone station, said data message being sent without first having to forward or redirect said voice call via said public switched network, and said enhanced telephone switching system bridging a connection to said second telephone station to the connection between said Internet and said first telephone station so that a caller at said second telephone station may communicate with said subscriber at said first telephone station, then responsive to receiving at said enhanced telephone switching system a voice call from a third telephone station directed to said third telephone station while said first telephone station is connected to said second telephone station, said enhanced telephone switching system bridging connections to said second telephone station and said third telephone station to a three-way conference circuit, and said enhanced telephone switching system bridging said three-way conference circuit to the connection between said Internet and said first telephone station.

54. The method of claim 53 wherein said step of bridging connections comprises the steps of, responsive to receiving said voice call from said third telephone station at said enhanced telephone switching system, sending a data message via said Internet connection to said first telephone station to alert a subscriber there at to the receipt of the voice call from said third telephone station, and responsive to receiving from said first telephone station via said Internet connection a message containing a request to three-way answer said voice call performing said step of bridging connections.

* * * * *

UNITED STATES PATENT AND TRADEMARK OFFICE
CERTIFICATE OF CORRECTION

PATENT NO.     : 6,353,611 B1
DATED          : March 5, 2002
INVENTOR(S)    : John H. Norris and Thomas Leonard Russell, Jr.

It is certified that error appears in the above-identified patent and that said Letters Patent is hereby corrected as shown below:

Column 9,
Line 61, the word -- method -- should replace the word "met".
Line 67, the word -- to -- should replace the word "To".

Column 11,
Line 13, the word -- alternate -- should replace the word "alter".
Line 34, the word -- said -- should replace the word "sad".
Line 54, the word -- intranet -- should replace the word "Internet".
Line 56, the word -- to -- should replace the word "lo".

Column 12,
Line 12, the word -- method -- should replace the word "mead".
Line 41, the word -- containing -- should replace the word "contain".

Column 13,
Line 17, the word -- switched -- should replace the word "switch".
Line 25, the word -- Internet -- should replace the word "internet".
Line 32, the word -- second -- should replace the word "so".

Column 14,
Line 22, the word -- said -- should replace the word "sad".
Line 28, the word -- that -- should replace the word "tat".
Line 30, the word -- subscriber -- should replace the word "subscribe".
Line 45, the word -- said -- should replace the word "sad".
Line 51, the word -- connection -- should replace the words "con on".

UNITED STATES PATENT AND TRADEMARK OFFICE
CERTIFICATE OF CORRECTION

PATENT NO.    : 6,353,611 B1
DATED         : March 5, 2002
INVENTOR(S)   : John H. Norris and Thomas Leonard Russell, Jr.

It is certified that error appears in the above-identified patent and that said Letters Patent is hereby corrected as shown below:

Column 15,
Line 1, the word -- Internet -- should replace the word "Interest".

Signed and Sealed this

Fourth Day of June, 2002

Attest:

Attesting Officer

JAMES E. ROGAN
Director of the United States Patent and Trademark Office